Patented May 5, 1936

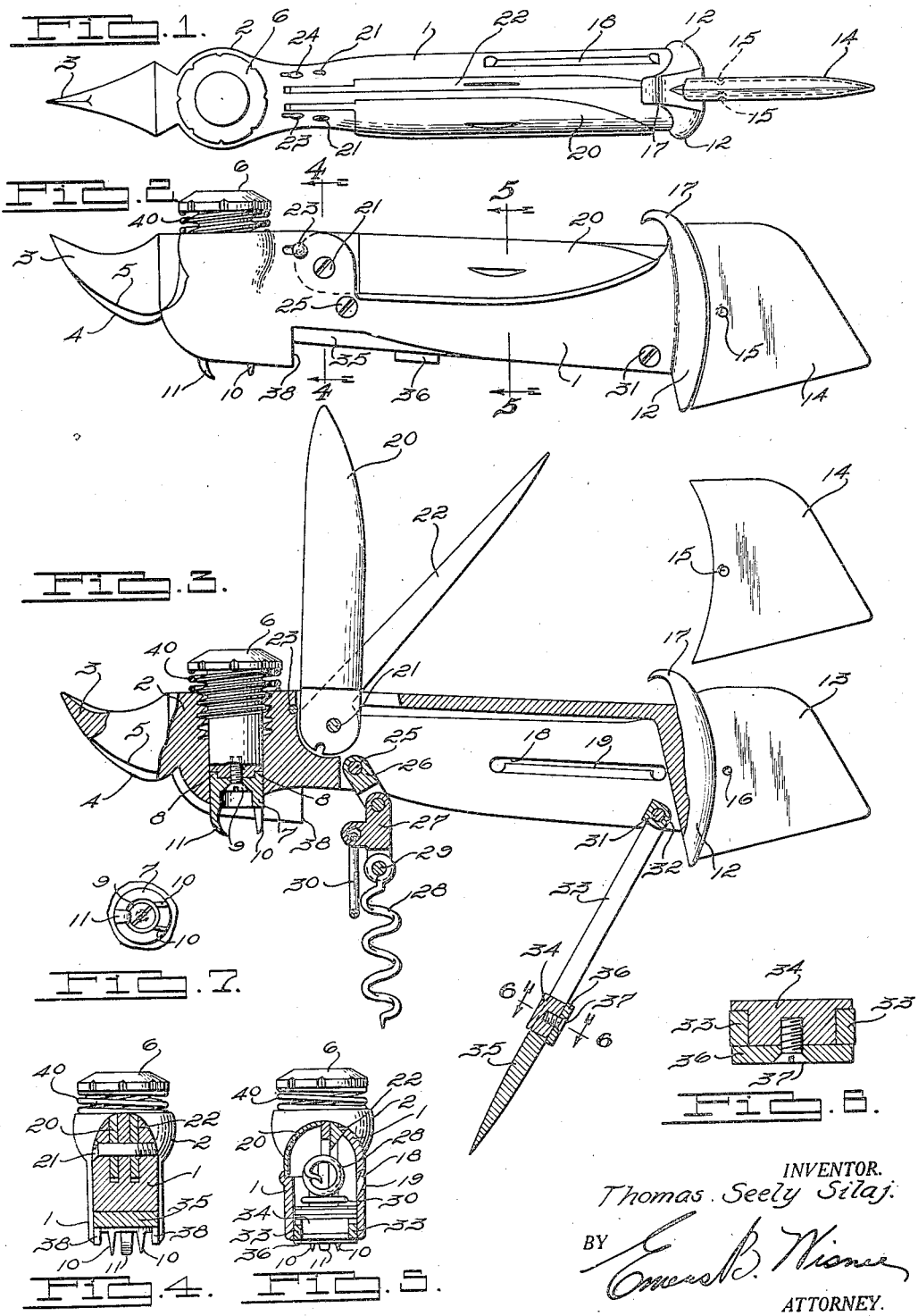

2,039,850

UNITED STATES PATENT OFFICE 2,039,850

COMBINATION SHRIMP CLEANER AND CULINARY IMPLEMENT

Thomas Seely Silaj, Detroit, Mich., assignor of one-half to Xenophon G. Lombros, Detroit, Mich.

Application July 12, 1935, Serial No. 30,983

3 Claims. (Cl. 17—7)

This invention relates to a combination shrimp cleaner and culinary implement and the object of the invention is to provide a culinary implement which may be utilized in the restaurant or kitchen but which is particularly useful in cleaning shrimp.

Another object of the invention is to provide a device of the character described provided with a threaded member adjustable in the handle and carrying a series of knives for slitting and cleaning shrimp, the knives being adjustable for a deeper or shallower cut by adjustment of said threaded member.

Another object of the invention is to provide a culinary implement of particular advantage in preparing sea food for the table and combining a shrimp cleaner and an oyster and clam opener together with other parts for culinary use.

A further object of the invention is to provide a culinary implement arranged for cleaning large or small shrimp.

These objects and the several novel features of the invention are hereinafter more fully described and claimed and the preferred form of construction by which these objects are attained is shown in the accompanying drawing in which—

Fig. 1 is a plan view of a combination shrimp cleaner and culinary implement embodying my invention.

Fig. 2 is a side elevation thereof.

Fig. 3 is a partial longitudinal section through the device and showing the different parts opened up.

Fig. 4 is a section taken on line 4—4 of Fig. 2.

Fig. 5 is a section taken on line 5—5 of Fig. 2.

Fig. 6 is an enlarged section taken on line 6—6 of Fig. 3.

Fig. 7 is an end view of the adjustable shrimp cleaning knife.

The device, as shown in Fig. 1, comprises a stainless steel handle 1 having an enlarged end 2 terminating in a sharpened point 3. This point 3, as shown in Fig. 2, is provided with a central edge 4 and a secondary edge 5 on each side thereof. A member 6 is threaded into an aperture provided therefor in the end 2, as will be understood from Fig. 3, and the knife comprises a circular member 7 having lugs 8 fitting in recesses provided therefor in the member 6 and having a screw 9 extending through the member 7 and threaded into the member 8 to secure the knife portion to the member 6. As shown in Fig. 7, the portion 7 is provided with two spaced knife blades 10 and at the opposite side a hooked knife blade 11 is provided which is diametrically opposite the space between the two spaced blades 10.

With the parts in the position shown in Fig. 2, the handle may be grasped in the right hand and the shrimp may be held in the left hand, at which time, the device may be drawn to the right over the shrimp so that the two blades 10 cut two slits in the shrimp and the hooked blade 11 will remove the portion of the shrimp between the slits. In this way the shrimp may be readily cleaned and the knives may be adjusted by giving the member 6 a complete turn inward or outward to give the proper knife depth in accordance with the size of the shrimp. The shrimp knife may be held at any adjustment by the coiled spring 40, shown in Figs. 2 and 3.

For very small shrimp, the edge 4 of the sharpened point 3 may be moved over the shrimp to slit the same to a shallow depth, at which time the pointed end 3 may be turned over and moved through the slit to clean out the slit. At the opposite end the handle is provided with an enlarged portion 12, shown in Figs. 2 and 3, and a blade 13 extends from this portion and may be utilized for opening clam and oyster shells and for slitting can tops and for other purposes, if desired. A sheet metal cover 14 is provided for this blade 13 which may be slipped over the blade and is provided with depressions 15 which may engage in the recesses 16 provided on opposite sides of the blade, as shown in Fig. 1. The portion 12 is provided with a hook end 17, shown in Figs. 1 and 3, which may be utilized as a bottle opener for removing bottle caps. As shown in Figs. 1 and 3, the handle is provided with a slot 18 having a sharp edge 19 which may be utilized in peeling potatoes, apples, peaches or other fruits. A curved knife blade 20 is pivotally mounted on the pin 21 and may be turned out for use in coring apples, cutting grape fruit or for other purposes and an ice pick 22 is mounted on this same pivot and fits into the handle, as shown in Fig. 1. The curved blade 20 may be locked in the closed position by a sliding pin 23 and the ice pick 22 may be locked in the closed position by a sliding pin 24.

A screw 25 is also provided in the handle on which a member 26 is pivotally mounted and a member 27 is pivotally connected to the member 26 and carries a corkscrew 28 which is pivotally mounted in the member 27 at 29. This portion of the device is so arranged that the corkscrew may be positioned in the handle between the slot 18 and the top of the handle, shown in Fig. 3, and a link 30 is connected to the member 27 so that the link may be grasped in the fingers for withdrawing the corkscrew from the handle. A screw 31 is mounted in the end of the handle opposite the shrimp cleaner and a member 32 is pivotally mounted thereon. This member 32 is provided with two side portions 33, as shown in Fig. 6, with a space therebetween and a block 34 is slidably mounted between the said side portion. The end of the member 32 is provided with a flat point 35 which may be utilized for insertion into an oyster or clam shell to kill the oyster or clam before it is opened. The block 34 is provided with a plate 36 secured to the block 34 by the screw 37 and this block is slidable on the side members 33 to any desired position. The end of the device carrying the shrimp cleaning knives is provided with a fairly sharp edge 38 and this edge may be engaged against one side of a screw cap while the block 34 may be moved with the hand to bring the plate 36 into engagement with the opposite side of the screw cap. By holding the member 36 in tight engagement with the screw cap the entire device may be turned to unthread the cap from the container.

From the foregoing description it becomes evident that the device is very simple and efficient in operation, will not easily get out of order, is very effective for use in cleaning shrimp and provides a device which accomplishes the objects described.

Having thus fully described my invention, its utility and mode of operation, what I claim and desire to secure by Letters Patent of the United States is—

1. In a culinary implement, a handle member provided with a point at one end, a member threaded through the handle member and provided with a circular end, a blade member secured to said circular end and having a pair of blades extending in spaced relation at one side of said circular end and a curved blade extending from the opposite side of the circular member diametrically opposite the space between said spaced blades, the threaded member being adjustable in the handle to vary the position of the blade, and spring means yieldably holding the threaded member in position.

2. In a culinary implement, a handle member provided with a point at one end, a member threaded through the handle member and provided with a circular end, a blade member secured to said circular end and having a pair of blades extending in spaced relation at one side of said circular end and a curved blade extending from the opposite side of the circular member diametrically opposite the space between said spaced blades.

3. In a culinary implement, a handle member, a member threaded through the handle member, the threaded member being provided with a circular end, a pair of blades extending in spaced relation at one side of said circular end and a blade mounted on the opposite side of said circular end and diametrically opposite the space between said spaced blades.

THOMAS SEELY SILAJ.